United States Patent [19]

Küter

[11] 4,007,389
[45] Feb. 8, 1977

[54] ROTATING RECTIFIER ASSEMBLY FOR ELECTRIC MACHINES

[75] Inventor: Heinrich Küter, Wattenscheid, Germany

[73] Assignee: Kraftwerk Union Aktiengesellschaft, Mulherim (Ruhr), Germany

[22] Filed: July 10, 1975

[21] Appl. No.: 594,750

[30] Foreign Application Priority Data

July 15, 1974 Germany .......................... 2433955

[52] U.S. Cl. ................................. 310/68 D; 310/65
[51] Int. Cl.$^2$ ...................................... H02K 11/00
[58] Field of Search ............. 310/68, 68 D, 71, 52, 310/72, 54, 165, 65, 66; 321/8, 8 C; 318/242

[56] References Cited

UNITED STATES PATENTS

| | | | |
|---|---|---|---|
| 3,283,219 | 11/1966 | Keady | 310/68 |
| 3,363,122 | 1/1968 | Hoover | 310/68 |
| 3,371,235 | 2/1968 | Hoover | 310/68 |
| 3,590,291 | 6/1971 | Spisak | 310/68 D |
| 3,721,843 | 3/1973 | Spisak | 310/72 |
| 3,852,628 | 12/1974 | Spisak | 310/68 D |
| 3,872,335 | 3/1975 | Petersen | 310/72 |

*Primary Examiner*—R. Skudy
*Attorney, Agent, or Firm*—Herbert L. Lerner

[57] ABSTRACT

Multiphase bridge circuit for electric machines includes a rotating rectifier assembly having cooling members, rectifier cells and fuses, and including a carrier wheel having a radially outer annular flange extending therefrom, the rectifier cells being radially outwardly braced at the inner side of the annular flange, the cooling members being current-conductive and being interposed between the rectifier cells and the inner side of the annular flange, the cooling members being electrically connected with the rectifier cells and being insulated from the carrier wheel, and the fuses being directly braced at the annular flange, one of the fuses, respectively, being serially connected with each of the cooling members, the outer annular flange having a free side spaced from the carrier wheel, the fuses being fastened at the free side of the outer annular flange at locations thereof alternatingly offset from one another in axial direction of the carrier wheel.

4 Claims, 3 Drawing Figures

ROTATING RECTIFIER ASSEMBLY FOR ELECTRIC MACHINES

The invention relates to a rotating rectifier assembly in a multiphase i.e. threephase, bridge circuit for electric machines. More particularly, the invention relates to such a rotating rectifier assembly wherein rectifier cells are radially outwardly braces at the inner side of an annular flange extending from a carrier wheel, current-conductive cooling members electrically connected with the rectifier cells and insulated from the carrier wheel being interposed between the rectifier cells and the inner side of the annular flange, and a respective fuse directly braced at the annular flange is serially connected with each of the cooling members.

A rectifier assembly of the foregoing general type has become known heretofore from U.S. Pat. No. 3,371,235. In the assembly described in that patent, all of the active structural member or components, such as cooling members rectifier cells and fuses, including their respective multiphase or threephase current conductors or leads, are disposed in one radial plane, respectively, at the inner periphery of the annular flange of the carrier wheel. A prerequisite for maximal utilization is thereby to install as many as possible of the aforementioned structural members or components at the periphery. If the distribution at the periphery is determined in this sense in accordance with the required width for cooling members and rectifier cells, the dimensions of the utilizable width at the periphery of the carrier wheel flange for the fuses is also thereby simultaneously established.

Since the voltage limits for such an assembly is solely determined, however, by the fuses, because all of the other structural members or components readily tolerate or admit higher voltages and a corresponding power increase, the maximal voltage is thereby determined also by the restriction or limitation of the space for the fuses, if one does not wish to place less rectifier cells at the periphery.

It is accordingly an object of the invention to provide a rotating rectifier assembly according to the invention wherein fuses for very high voltages also can be disposed at the flange of the carrier wheel without limiting the number of rectifier cells.

With the foregoing and other objects in view, there is provided, in accordance with the invention, in a multiphase bridge circuit for electric machines, a rotating rectifier assembly comprising cooling members rectifier cells and fuses, and including a carrier wheel having a radially outer annular flange extending therefrom, the rectifier cells being radially outwardly braced at the inner side of the annular flange, the cooling members being current-conductive and being interposed between the rectifier cells and the inner side of the annular flange, the cooling members being electrically connected with the rectifier cells and being insulated from the carrier wheel, and the fuses being directly braced at the annular flange, one of the fuses, respectively, being serially connected with each of the cooling members, the outer annular flange having a free side spaced from the carrier wheel, the fuses being fastened at the free side of the outer annular flange at locations thereof alternatingly offset from one another in axial direction of the carrier wheel.

With such a staggered arrangement, the distribution at the periphery is determinable in accordance with the required number of cooling members and diodes or rectifier cells, while the space requirement of the fuses is then determinative only of the extent of axial offset thereof one from another.

Other features which are considered as characteristic for the invention are set forth in the appended claims.

Although the invention is illustrated and described herein as embodied in rotating rectifier assembly for electric machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
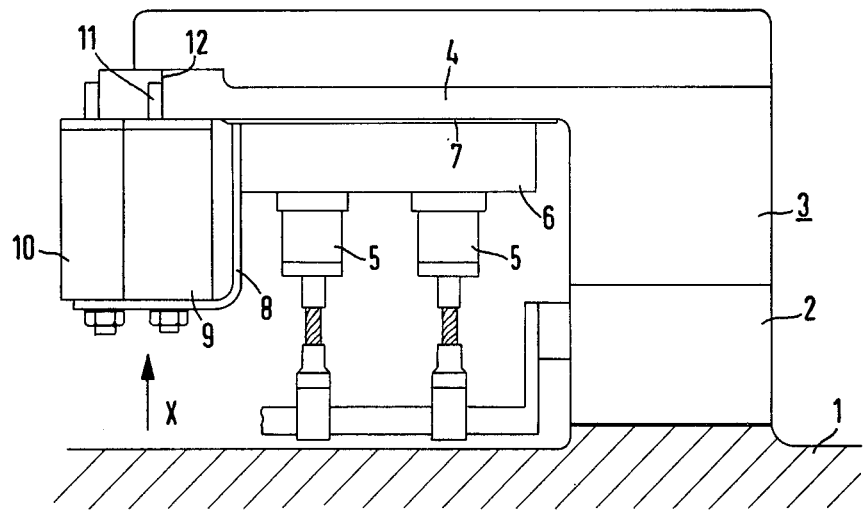
FIG. 1 is a longitudinal view, partly in section, of half of a rotating rectifier assembly according to the invention, the other half being located on the other side of the shaft, and being a mirror image of the illustrated half.

Referring now to the drawings and first, particularly to FIG. 1 thereof, there is shown in longitudinal sectional view an exciter shaft 1 on which a hub 2 of a carrier wheel 3, which accommodates all of the structural members of components of the rotating rectifier assembly, is insulatedly shrink-fitted. The carrier wheel 3 has a radially outer annular flange 4 extending therefrom. Cooling members 6, which carry rectifier cells 5, are fastened with an intermediate layer of insulation 7 to the inner side of the annular flange 4. A fuse 9 serially connected by a connecting strap or bracket 8 to the cooling members 6 is braced or supported at the outer end of the annular flange 4 and is threadedly secured through a strip or clip 11 to the end face 12 of the annular flange 4.

The peripheral section at the annular flange 4 that is available for the fuses 9, 10 is determined by the number of cooling members 6 and rectifier diodes 5 disposed on the annular flange 4. For a power increase, which primarily requires a higher voltage and therefore also fuses of considerably greater dimensions, the space for the fuses which is pre-established through the width of the cooling members, is inadequate, however. For this reason in accordance with the invention, the fuses 9, 10 have been disposed offset from one another alternatingly in axial direction. For this reason, the annular flange 4, as is shown especially in the developed view of FIG. 2 which is in a direction from below toward the fuses of FIG. 1, is provided with projections 13 at the end face thereof for every second fuse 10, so that, respectively, in peripheral direction, each second fuse 10 is located on the same peripheral circle 15 while all of the other alternate fuses 9 are located on a different common peripheral circle 14. The spacing between both circles 14 and 15 is thus determined by the required amount of axial offset between the alternating fuses 9, 10, in order to be able to accommodate the required number of fuses at the periphery of the annular flange 4. Actually, this offset is only relatively small, however, and produces only a negligible increase in the length of the annular flange 4 in axial direction. Also, the possibility of monitoring or observing the characteristic or identification indicator, such as a break in the low-melting conductor, of the inner-lying fuses is scarcely reduced.

Figure 2:
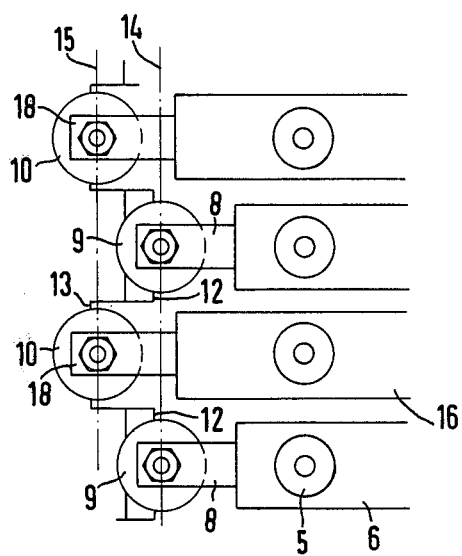
FIG. 2 is a developed view of FIG. 1 as seen from below in direction of the arrow X toward the fuses.

As can be seen in FIG. 2, the respective cooling members 6, 16 are offset with their respective rectifier cells 5 to the same extent as are the fuses 9, 10, so that the connecting straps or brackets 8, 18 are respectively of equal length.

Figure 3:
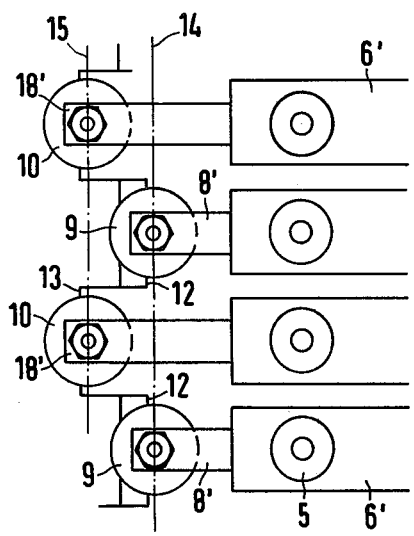
FIG. 3 is a view similar to that of FIG. 2 of another embodiment of the invention.

In the different embodiment of FIG. 3, all of the cooling members 6' are of the same size and are assembled without any offset from one another. The connecting straps or brackets 18', however, are of suitably greater length than the connecting straps or brackets 8' alternatingly assembled therewith.

With the aforedescribed offset disposition of the fuses, a power increase of a rotating rectifier assembly in proportion to the fuse voltage is possible at virtually the same dimensions of a corresponding assembly without the offset fuses. An optimal design of the generator rotor windings associated therewith is thereby possible due to the fact that those winding can be constructed for higher voltages.

I claim:

1. In a multiphase bridge circuit for electric machines, a rotating rectifier assembly comprising cooling members, rectifier cells and fuses, and including a carrier wheel having a radially outer annular flange extending therefrom, said rectifier cells being radially outwardly braced at the inner side of said annular flange, said cooling members being current-conductive and being interposed between said rectifier cells and said inner side of said annular flange, said cooling members being electrically connected with said rectifier cells and being insulated from said carrier wheel, and said fuses being directly braced at said annular flange, one of said fuses, respectively, being serially connected with each of said cooling members, said outer annular flange having a free side spaced from said carrier wheel, said fuses being fastened at said free side of said outer annular flange at locations thereof alternatingly offset from one another in axial direction of said carrier wheel, said outer annular flange being formed, at said free side thereof, with an axial projection for every second one of said fuses.

2. Rotating rectifier assembly according to claim 1 wherein said cooling members carrying said rectifier cells terminate at respective locations spaced at equal distances axially from the respective fuses associated therewith.

3. Rotating rectifier assembly according to claim 2 wherein said cooling members are alternating offset from one another in axial direction of said carrier wheel to the same extent as the respective fuses associated therewith.

4. Rotating rectifier assembly according to claim 1 wherein said cooling members terminate at the same peripheral line, and including connections straps between the respective cooling members and fuses, said connecting straps being of alternatingly varying lengths.

* * * * *